US010895996B2

(12) United States Patent
Zhou et al.

(10) Patent No.: US 10,895,996 B2
(45) Date of Patent: Jan. 19, 2021

(54) DATA SYNCHRONIZATION METHOD, SYSTEM, AND APPARATUS USING A WORK LOG FOR SYNCHRONIZING DATA GREATER THAN A THRESHOLD VALUE

(71) Applicant: TENCENT TECHNOLOGY (SHENZHEN) COMPANY LIMITED, Guangdong (CN)

(72) Inventors: Ling Zhou, Shenzhen (CN); Zheng Chen, Shenzhen (CN); Jun Ming Yan, Shenzhen (CN); Cheng Wu, Shenzhen (CN); Feng Bo Jiang, Shenzhen (CN); Li Zhang, Shenzhen (CN); Fang Zhou Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 16/040,692

(22) Filed: Jul. 20, 2018

(65) Prior Publication Data

US 2018/0329630 A1 Nov. 15, 2018

Related U.S. Application Data

(63) Continuation of application No. PCT/CN2017/099687, filed on Aug. 30, 2017.

(30) Foreign Application Priority Data

Sep. 13, 2016 (CN) .......................... 2016 1 0821980

(51) Int. Cl.

*G06F 3/06* (2006.01)
*G06F 11/14* (2006.01)
*H04L 29/08* (2006.01)

(52) U.S. Cl.

CPC .............. *G06F 3/065* (2013.01); *G06F 3/067* (2013.01); *G06F 3/0619* (2013.01); *G06F 11/14* (2013.01);

(Continued)

(58) Field of Classification Search

CPC ...... G06F 3/0605; G06F 3/0619; G06F 3/067; G06F 11/14; H04L 67/1095; H04L 67/1097

See application file for complete search history.

(56) References Cited

U.S. PATENT DOCUMENTS

2012/0066293 A1 3/2012 Nakagawa
2015/0199414 A1* 7/2015 Braginsky ............. G06F 16/172 707/613
2016/0134571 A1* 5/2016 Lindley ................... H04L 51/08 709/206

FOREIGN PATENT DOCUMENTS

CN 102801699 A 11/2012
CN 105407117 A 3/2016

(Continued)

OTHER PUBLICATIONS

CN 105407117, machine translation of Description and Claims, obtained from Espacenet, Sep. 12, 2019, 30 pages.*

(Continued)

*Primary Examiner* — Tuan V Thai
(74) *Attorney, Agent, or Firm* — Sughrue Mion, PLLC

(57) ABSTRACT

A data synchronization method, system and apparatus are provided. The method includes receiving a request including data to be uploaded, from a client, and responding to the request after data is successfully obtained from the client, and storing the obtained data. For data whose size is less than a threshold value, a synchronization request is sent to a standby server to request the standby server to store the data. Otherwise a second type work log, including information indicating that data that has not been synchronized, is generated and stored. Data whose size is greater than or equal to the threshold value is not synchronized immediately, but is recorded in the work log. In some cases, data whose size is less than the threshold value, but fails to be synchronized, is recorded in the work log. Synchronization of this data may be subsequently completed according to the work log, so that the synchronization of this data can avoid affecting synchronization of other data. A first-type work log comprising information about the data may be generated and stored in response to the data being synchronized to the standby server successfully. Data that has not been synchronized to the standby server, according to the indication information, may be locally read and the data sent to the standby server to be stored. Data may be sent to the standby server to replace other data, in response to verification codes, such as hash codes, being inconsistent. The first and second work logs may also be sent to a log backup device.

(Continued)

Receive an uploading request sent by a client, the uploading request including to-be-uploaded data — 101

Respond to the uploading request of the client after the data is obtained successfully, and store the obtained data — 102

Initiate a synchronization request for the data to a standby server if the value of the data stored in step 102 is not greater than a threshold value, to request synchronization of the data to the standby server, so that the standby server stores the data — 103

Generate and store a second-type work log if the value of the data is greater than the threshold value, the second-type work log including: information that data has not been synchronized to the standby server — 104

Responding to the uploading request and sending data to the standby server may occur asynchronously.

9 Claims, 13 Drawing Sheets

(52) U.S. Cl.
CPC ...... *H04L 67/1095* (2013.01); *H04L 67/1097* (2013.01)

(56) References Cited

FOREIGN PATENT DOCUMENTS

| | | |
|---|---|---|
| CN | 105610953 A | 5/2016 |
| CN | 106302806 A | 1/2017 |

OTHER PUBLICATIONS

International Search Report for PCT/CN2017/099687, dated Dec. 4, 2017.

* cited by examiner

DATA SYNCHRONIZATION METHOD, SYSTEM, AND APPARATUS USING A WORK LOG FOR SYNCHRONIZING DATA GREATER THAN A THRESHOLD VALUE

CROSS-REFERENCE TO RELATED APPLICATIONS

This application is a continuation of International Patent Application No. PCT/CN2017/099687, filed on Aug. 30, 2017, which claims priority from Chinese Patent Application No. 201610821980.0, entitled "DATA SYNCHRONIZATION METHOD AND SYSTEM, SYNCHRONIZATION OBTAINING METHOD, AND RELATED APPARATUS" filed with the Patent Office of China on Sep. 13, 2016, the disclosures of which are incorporated by reference herein in their entirety.

BACKGROUND

1. Field

Embodiments relate to the field of communications technologies, and in particular, to a data synchronization method and system, a data synchronization obtaining method, and a related apparatus.

2. Description of Related Art

A related art cloud storage system is deployed with a primary server and a standby server. When the primary server is faulty, the standby server is used to store data uploaded by a user by using a client. Therefore, it needs to be ensured that corresponding data stored in the primary server and corresponding data stored in the standby server are the same, so that after the primary server is switched over, it can be ensured that the data uploaded by the client previously can also be obtained from the standby server.

SUMMARY

It is an aspect of the present disclosure to provide a data synchronization method and system, a synchronization obtaining method, and a related apparatus, so that after an uploading request is processed, data whose value is not greater than a threshold value is transmitted asynchronously to a standby server for synchronization.

According to an aspect of one or more example embodiments, there is provided a method. The method includes receiving an uploading request from a client that includes data to be uploaded. A response to the uploading request is sent after the data is obtained successfully from the client. The obtained data is stored. When the value of the data is less than a threshold value, a synchronization request is initiated to a standby server for requesting the standby server to store the data, and when the value of the data is greater than or equal to the threshold value, a second-type work log comprising indication information for indicating data that has not been synchronized to the standby server is generated and stored.

According to other aspects of one or more example embodiments, there is also provided an apparatus, a system and other methods consistent with the method above.

BRIEF DESCRIPTION OF THE DRAWINGS

To describe the technical solutions in the embodiments or in the related art technology more clearly, the following briefly describes the accompanying drawings required for describing the embodiments or the related art technology. Apparently, the accompanying drawings in the following description show merely some embodiments, and a person of ordinary skill in the art may still derive other drawings from these accompanying drawings without creative efforts. In the drawings.

DETAILED DESCRIPTION

Figure 1:
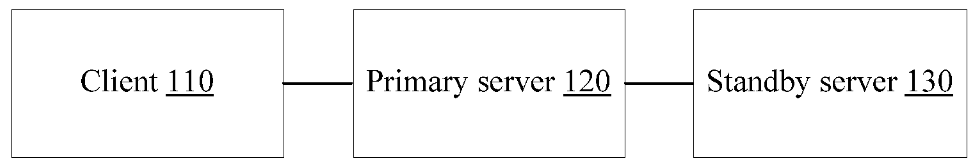
FIG. 1 is a schematic structural diagram of a data synchronization system according to an embodiment.

The following clearly and completely describes the technical solutions in the embodiments with reference to the accompanying drawings in the embodiments. Obviously, the described embodiments are only some embodiments instead of all embodiments. All other embodiments obtained by a person of ordinary skill in the art based on the embodiments without creative effects shall fall within the protection scope of the present disclosure.

The terms "first", "second", "third", "fourth", and the like (if they exist) in the specification and the claims of the present disclosure and the foregoing accompanying drawings are used for distinguishing similar objects, and do not need to be used for describing a particular sequence or order. It should be understood that data used in this way is interchangeable in a suitable case, so that the embodiments described herein can be implemented in a sequence in addition to the sequence shown or described herein. In addition, the terms "include", "comprise", and any variants thereof are intended to cover a non-exclusive inclusion. For example, a process, method, system, product, or device that includes a series of steps or elements is not limited to the steps or units that are clearly listed, but may include other steps or units that are not clearly listed or that are inherent to the process, method, product, or device.

In related art systems, when data is synchronized on a primary server and a standby server, after the primary server receives an uploading request of a client, the uploading request is transmitted to a common gateway interface (CGI)

module on both the primary server and the standby server to process the uploading request. After the CGI module of the primary server and the CGI module of the standby server process the uploading request completely, the primary server responds to the uploading request. If the primary server and the standby server are in different regions and have difference operators, problems such as a long response time and low reliability may be caused. This related art solution has relatively low controllability, and cannot deal with various emergency situations, for example, sudden rising of traffic causes a large quantity of synchronization errors between the primary server and the standby server, and/or the network between the primary server and the standby server is disconnected, and data in the period of disconnection cannot be synchronized completely to the standby server. In order to resolve the foregoing problems, the embodiments provide technical solutions.

In contrast to the above, in the method of various embodiments, a primary server receives an uploading request sent by a client, immediately responds to the uploading request of the client after processing the uploading request, that is, after data is obtained successfully, and synchronizes data whose value is not greater than a threshold value to a standby server asynchronously. Because the processing step of the primary server for the uploading request and the synchronization step of the primary server for the data are performed asynchronously, the primary server does not need to respond to the client after both the primary server and the standby server store the data, so that synchronization of the data does not affect a service uploading process. The primary server temporarily does not synchronize data whose value is greater than the threshold value, but only records a second-type work log. The second-type work log includes information that data has failed to be synchronized to the standby server, so that the primary server may subsequently complete synchronization of the data according to the second-type work log, and synchronization of data with larger values can avoid affecting synchronization of other data.

Method Embodiment 1

A data synchronization method is provided and is mainly applied to a data synchronization system shown in FIG. 1, such as a cloud storage system. The system includes a client 110, a primary server 120, and a standby server 130. The client 110 may upload data to the primary server 120, and the primary server 120 stores the data uploaded by the client, and synchronizes the data to the standby server 130. Generally, the client 110 communicates with the primary server 120 instead of communicating with the standby server 130. In this embodiment, the client 110 may communicate with the standby server 130, to determine whether corresponding data stored in the primary server 120 is consistent with corresponding data stored in the standby server 130.

Figure 2:
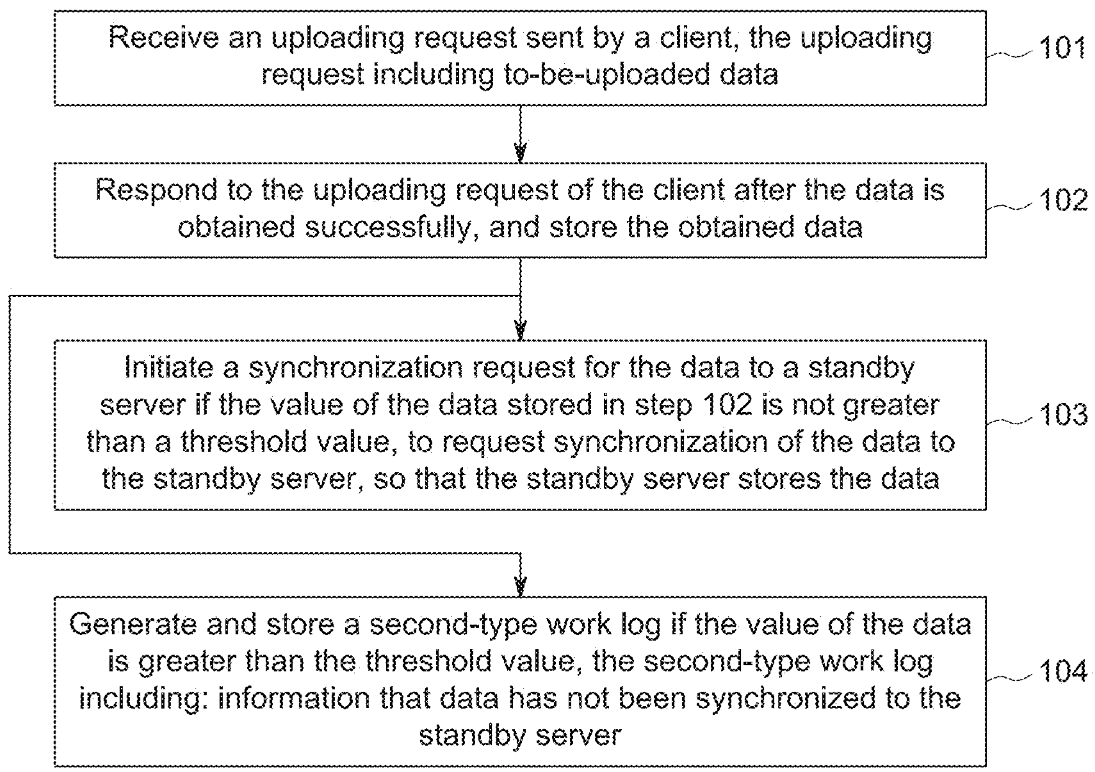
FIG. 2 is a flowchart of a data synchronization method according to an embodiment.

The method of this embodiment is a method performed by the primary server in the system. As illustrated in FIG. 2, the method includes:

Step 101. Receive an uploading request sent by a client, the uploading request including to-be-uploaded data.

Step 102. Respond to the uploading request of the client after the data is obtained successfully, and store the obtained data.

Step 103. Initiate a synchronization request for the data to a standby server if the value of the data stored in step 102 is not greater than a threshold value, to request synchronization of the data to the standby server, so that the standby server stores the data.

While step 102 is shown as preceding step 103 in FIG. 2, this is only an example, and embodiments are not limited to this example. That is, in some embodiments, steps 102 and 103 may be performed simultaneously.

Step 104. Generate and store a second-type work log (a first-type work log will be described below) if the value of the data is greater than the threshold value, where the second-type work log includes information that data has failed to be synchronized to the standby server, that is, indication information, used for indicating data that has not been synchronized to the standby server. For example, in some embodiments, the indication information may include one or more of information of the data, information that identifies data that has failed to be synchronized, information that identifies data that has not been synchronized, information that identifies the value of the data, and the like.

In this embodiment, for data with larger values (e.g. where a size of the data is greater than a threshold value), the primary server does not synchronize the data to the standby server according to the processing for the uploading request, but first records a second-type work log. In addition, if the size of the data is less than or equal to the threshold value but has failed to be synchronized to the standby server successfully, the primary server may also record the second-type work log. That the data has failed to be synchronized to the standby server may mean that the primary server fails in initiating the synchronization request to the standby server, and therefore, the data is not synchronized to the standby server successfully.

If the data is synchronized to the standby server successfully, for example, if the primary server initiates the synchronization request to the standby server successfully, the primary server may further record a first-type work log. Each first-type work log may include: information that the data is synchronized successfully, such as identification information of the data, and a storage path such as a Bucket name of the stored data and the value of the data, and may further include information such as a client identifier and an uploading path.

It should be noted that, one uploading request corresponds to one piece of the first-type work log or corresponds to one piece of the second-type work log.

It can be seen that, in the method of this embodiment, a primary server receives an uploading request sent by a client, immediately responds to the uploading request of the client after processing the uploading request, that is, after data is obtained successfully, and synchronizes data whose value is not greater than a threshold value to a standby server asynchronously. Because the response process of the primary server for the uploading request and the synchronization process of the primary server for the data, that is, synchronizing the data to the standby server are performed asynchronously, the primary server does not need to respond to the uploading request of the client after both the primary server and the standby server store the data. Because the uploading request of the client is responded to rapidly, the synchronization process of the data does not affect a service uploading process. The primary server temporarily does not synchronize the data whose value is greater than the threshold value, but only records, in the second-type work log, data that has not been synchronized to the standby server. In this way, the primary server subsequently may synchronize data that has not been synchronized to the standby server to the standby server according to the second-type work log, and synchronization of data with larger values can avoid affecting synchronization of other data.

In this embodiment, the primary server may start multiple threads sequentially, and execute the foregoing processing asynchronously. For example, after it is confirmed that the data is obtained successfully, a thread is generated to respond to the uploading request of the client. Another thread is generated to request to synchronize data whose value is not greater than the threshold value to the standby server. The threads may be executed asynchronously or synchronously.

In a specific embodiment, if the primary server stores the first-type work log, the primary server may further initiate a checking process regularly. The process may be as specifically shown in FIG. 3, and includes:

Step 201. Read multiple pieces of a locally stored first-type work log, and perform the following step 202 to step 205 separately for each piece of the first-type work log.

Step 202. Obtain a first verification code of first data that corresponds to the first-type work log and that is stored in the primary server. Specifically, the primary server may read information about data from the first-type work log. The information about the data may include: identification information, a storage path, and the like. The first data is read according to the information about the data, and the first verification code is obtained by performing a hash operation on the first data.

Step 203. Obtain a second verification code of second data that corresponds to the first-type work log and that is stored in the standby server. Specifically, the primary server may initiate a request to the standby server. The request may include information in the first-type work log, such as identification information of the data. The standby server obtains the corresponding second data according to the request, obtains the second verification code by performing a hash operation on the second data, and returns the second verification code to the primary server.

Step 204. Determine whether the first verification code is consistent with the second verification code. If the first verification code is consistent with the second verification code, go back to perform step 202 for another piece of the first-type work log. Alternatively, if the first verification code is inconsistent with the second verification code, it indicates that data stored in the primary server is inconsistent with data stored in the standby server, and (re)synchronization needs to be performed. Therefore, the operation proceeds to step 205.

Step 205. Send the first data to the standby server, so that the standby server replaces the second data with the first data to synchronize the data.

Figure 3:
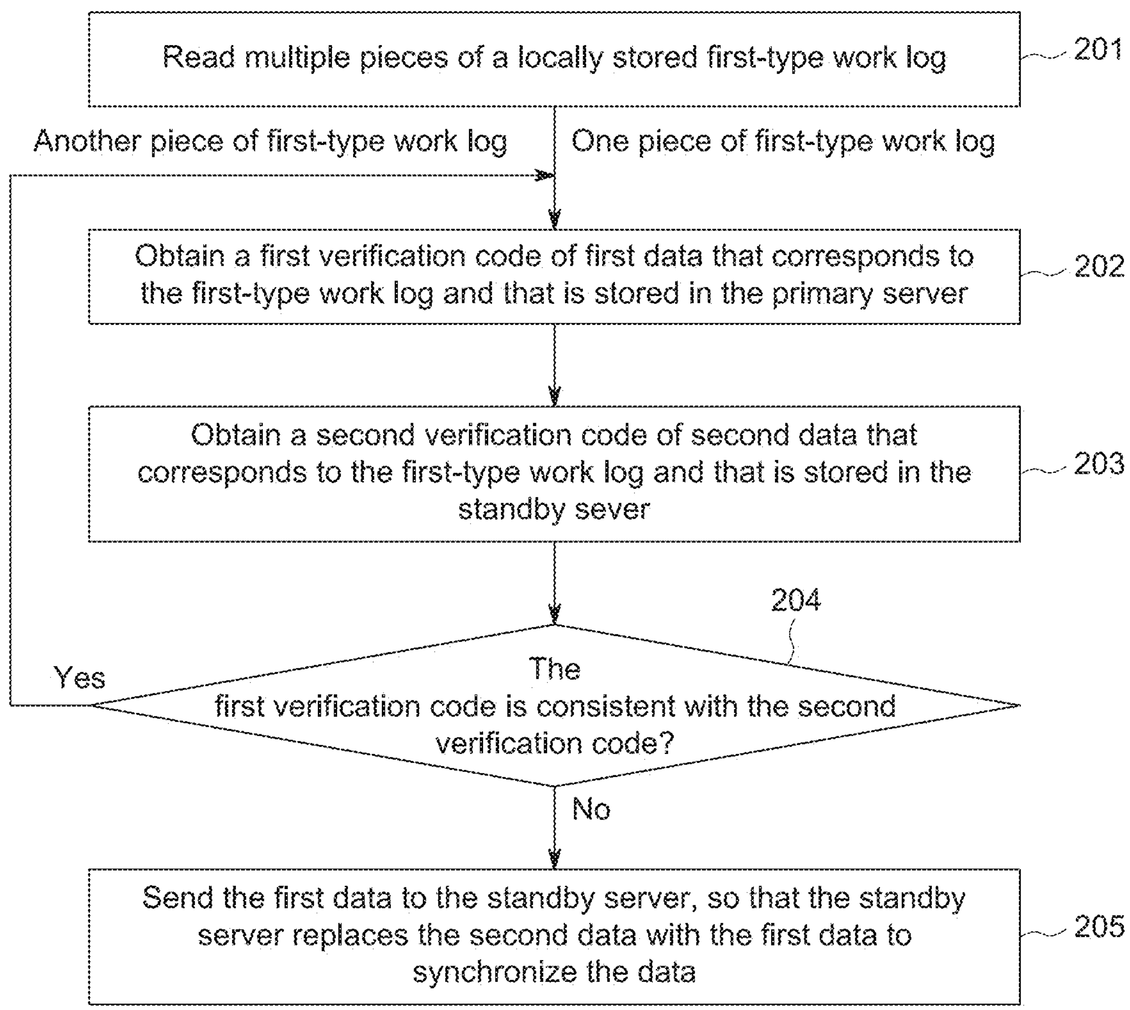
FIG. 3 is a flowchart of a checking process initiated by a primary server according to the method of FIG. 2.

While step 202 is shown as preceding step 203 in FIG. 3, this is only an example, and in some embodiments steps 202 and 203 may be performed simultaneously.

Through the foregoing step 201 to step 205, inconsistent synchronization data stored in the primary server and the standby server may be resynchronized, to ensure the consistency of the data.

In another specific embodiment, the primary server may continually initiate a synchronization redoing process. Specifically, the primary server continually reads a locally stored second-type work log piece by piece, obtains, for each piece of the read second-type work log, third data that corresponds to the second-type work log and that is stored in the primary server, and sends the third data to the standby server, so that the standby server stores the third data.

In another specific embodiment, the primary server may store data corresponding to each uploading request to another storage server deployed outside the primary server. The primary server stores a first-type work log and a second-type work log to the primary server, and sends the stored first-type work log and second-type work log to a log backup machine, so that the log backup machine stores the first-type work log and the second-type work log. When the primary server is faulty, the log backup machine initiates the foregoing checking process, that is, when it is determined, according to the first-type work log, that data stored in the primary server is inconsistent with data stored in the standby server, the data stored in the primary server is sent to the standby server for storage; or data that has failed to be synchronized is sent to the standby server according to the second-type work log for storage.

Method Embodiment 2

Figure 4:
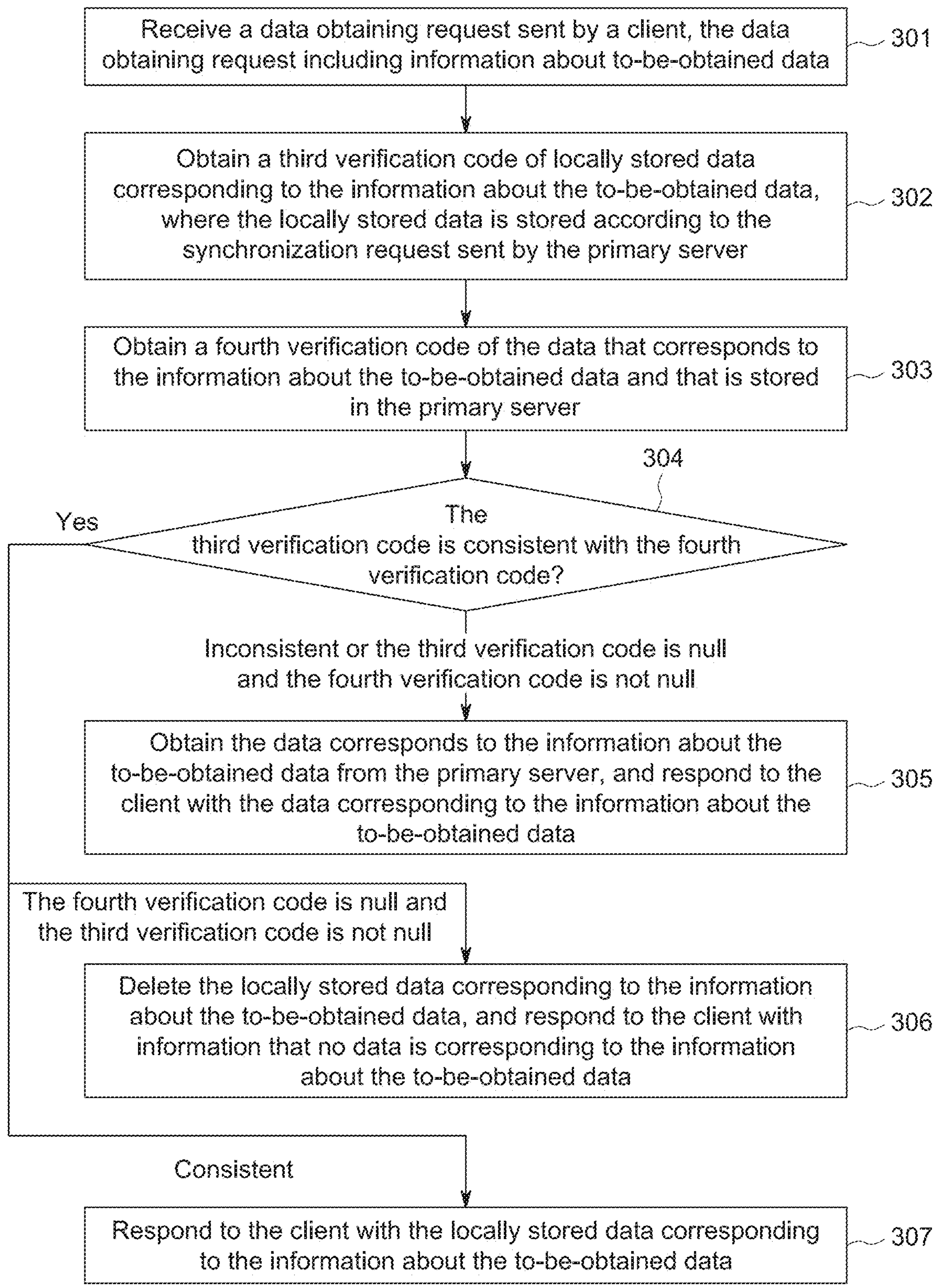
FIG. 4 is a flowchart of a data synchronization obtaining method according to an embodiment.

A data synchronization obtaining method is provided and may be mainly applied to a data synchronization system shown in FIG. 1. The method of this embodiment is a method that is for obtaining synchronized data and that is performed by a standby server in the system. As illustrated in FIG. 4, the method includes:

Step 301. Receive a data obtaining request sent by a client, the data obtaining request including information about to-be-obtained data.

It should be understood that, after storing data according to an uploading request sent by a client, a primary server sends a synchronization request for the data to a standby server, and then the standby server stores the corresponding data according to the synchronization request. A user may directly initiate, by using the client, the standby server to obtain uploaded specific data, to verify the consistency of the specific data stored in the standby server and the specific data stored in the primary server.

Step 302. Obtain a third verification code of locally stored data corresponding to the information about the to-be-obtained data, where the locally stored data is stored according to the synchronization request sent by the primary server. Specifically, the standby server may read the corresponding data according to the information about the to-be-obtained data, such as identification information of the to-be-obtained data, and then may obtain the third verification code by performing a hash operation on the read data.

Step 303. Obtain a fourth verification code of the data that corresponds to the information about the to-be-obtained data and that is stored in the primary server. Specifically, the standby server may initiate a request to the primary server. The request may include identification information of the to-be-obtained data, and the like. The primary server obtains the corresponding data according to the request, then obtains a fourth verification code by performing a hash operation on the data, and returns the fourth verification code to the standby server.

Step 304. Determine whether the third verification code is consistent with the fourth verification code. If the third verification code is inconsistent with the fourth verification code, or the third verification code is null and the fourth verification code is not null, it indicates that data stored in the primary server is inconsistent with data stored in the standby server, and the operation proceeds to step 305. If the fourth verification code is null and the third verification code is not null, it indicates that the corresponding data has been deleted from the primary server, and the operation proceeds to step 306. If the third verification code is consistent with the fourth verification code, the operation proceeds to step 307.

Step 305. Obtain the data corresponding to the information about the to-be-obtained data from the primary server, and respond with the data corresponding to the information about the to-be-obtained data to the client.

In this case, the standby server may record a second-type work log for the data. The second-type work log includes information that the data corresponding to the information about the to-be-obtained data has failed to be synchronized, such as identification information of the data, and information that identifies that the data has failed to be synchronized, and may further include the value of the data.

In this way, the standby server may further continually initiate a redoing process, that is, read the second-type work log stored in the standby server, and obtain data corresponding to the second-type work log from the primary server for storage, thereby ensuring the consistency of the data stored in the primary server and the data stored in the standby server.

Step 306. Delete the locally stored data corresponding to the information about the to-be-obtained data, and respond to the client with information that no data is corresponding to the information about the to-be-obtained data.

Step 307. Respond to the client with the locally stored data corresponding to the information about the to-be-obtained data.

While step 302 is shown as preceding step 303 in FIG. 4, this is only an example, and in some embodiments, steps 302 and 303 may be performed simultaneously.

It can be seen that, in this embodiment, a client may actively obtain data that has been synchronized on a standby server from the standby server, and the standby server verifies, according to information about the to-be-obtained data, whether the data stored in the standby server is consistent with data stored in a primary server. If the data stored in the standby server is inconsistent with the data stored in the primary server, the standby server obtains the data from the primary server, and returns the data to the client. In this way, the standby server may verify, according to a request of the client, whether the data stored in the standby server is consistent with the data stored in the primary server, to further ensure, in some manner, the consistency of the data stored in the standby server and the data stored in the primary server.

Method Embodiment 3

Figure 5:
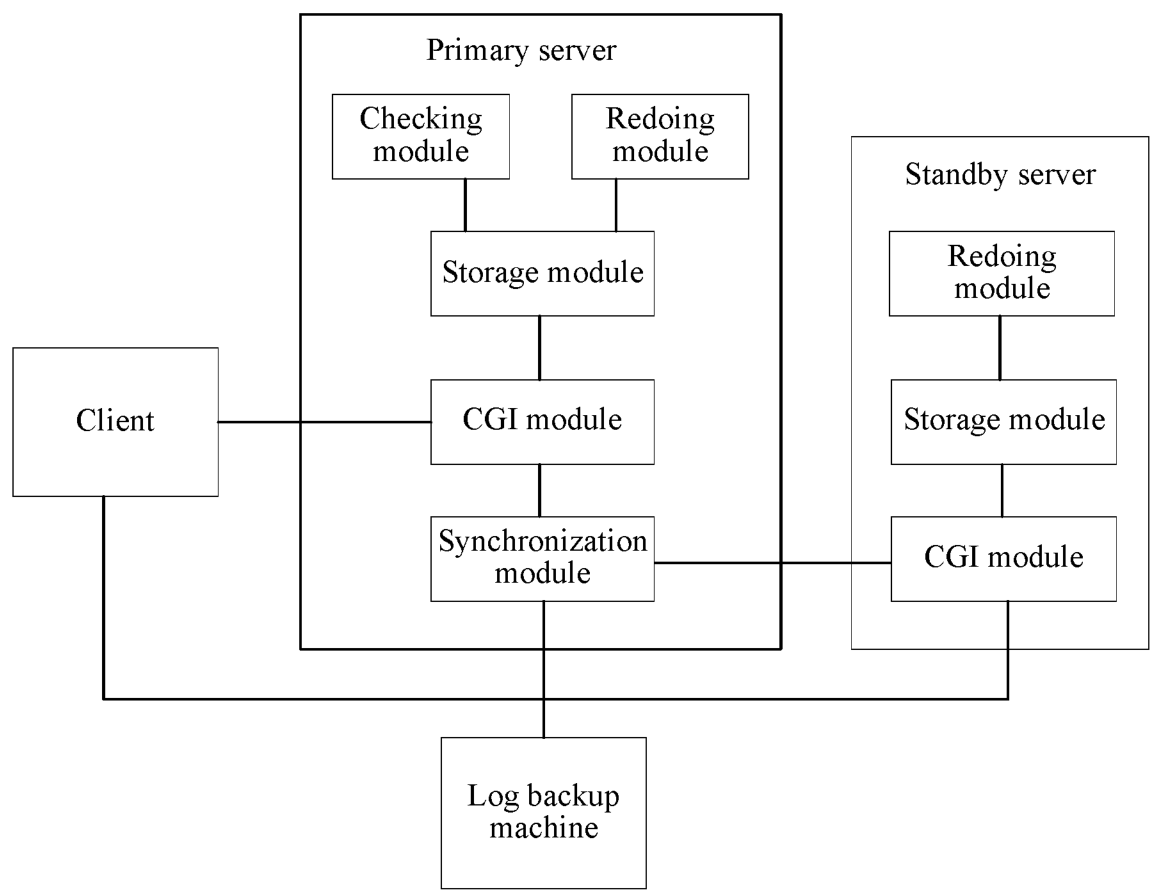
FIG. 5 is a schematic structural diagram of a data synchronization system according to another embodiment.
Figure 6:
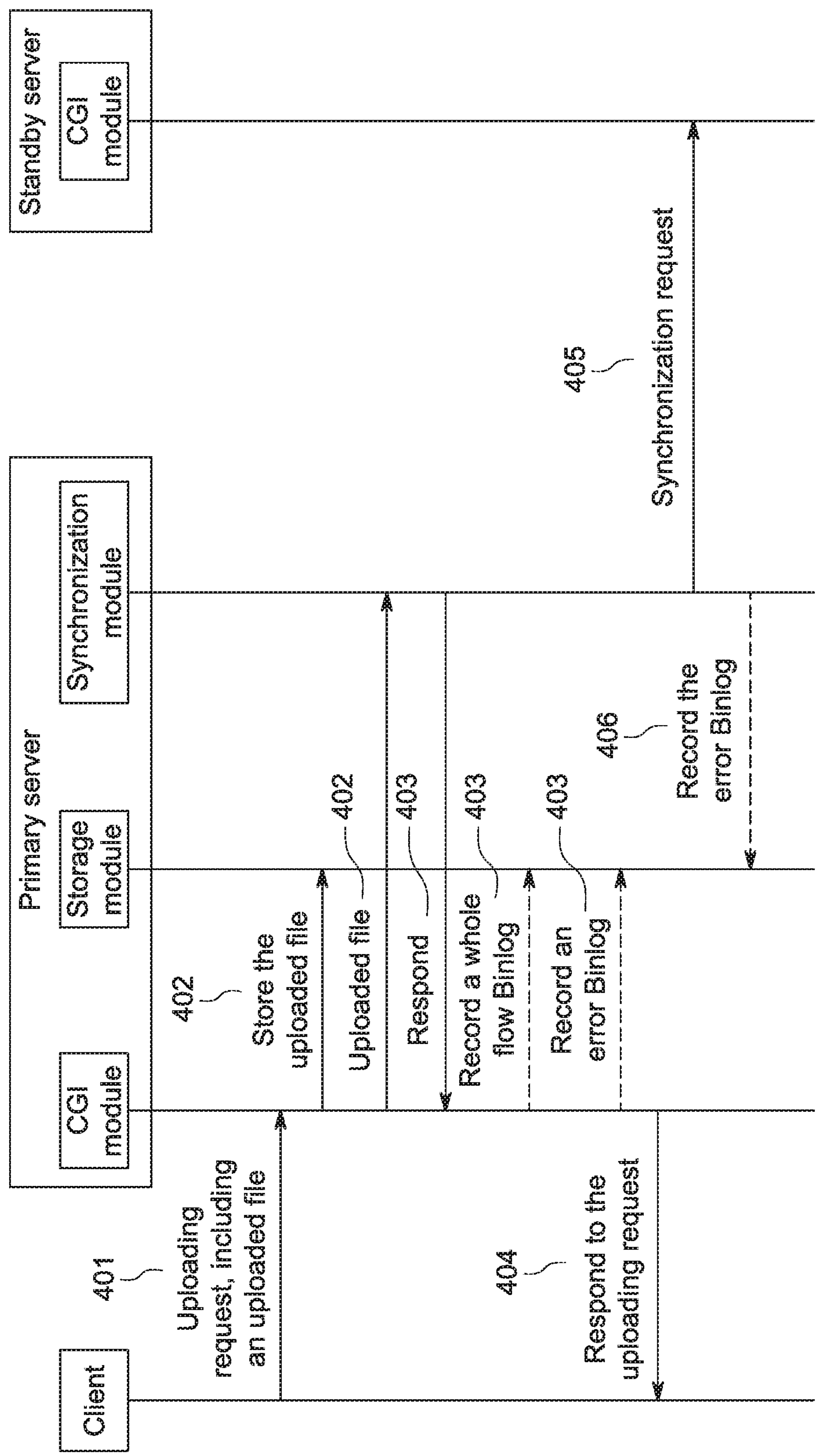
FIG. 6 is a flowchart of a data synchronization method according to another embodiment.

A specific embodiment is used to describe a data synchronization method of this embodiment. The method is mainly applied to a data synchronization system shown in FIG. 5, and data of this embodiment is an uploaded file. In the system of this embodiment:

A primary server includes: a CGI module, a synchronization (Syncer) module, a storage module, a checking module, and a redoing (Redoer) module. A standby server includes a CGI module, a storage module, and a redoing module. The data of this embodiment is in a specific synchronization process. As illustrated in FIG. 6, the process includes:

Step 401. A client sends an uploading request, the uploading request including an uploaded file.

Step 402. The CGI module of the primary server receives the uploading request, processes the uploading request, that is, obtains the uploaded file of the uploading request by means of parsing, and stores the uploaded file to the storage module if the size of the uploaded file is not greater than a threshold value. Then, the CGI module sends the uploaded file to the synchronization module of the primary server.

Step 403. The synchronization module immediately responds to the CGI module of the primary server after receiving the uploaded file, so that the CGI module records and stores a first-type work log to the storage module, where the first-type work log in this embodiment is a whole flow Binlog, and may specifically include content such as meta information of the file, that is, a file name, an uploading path, a Bucket name, a client identifier, and the size of the file; and if the synchronization module returns failure information to the CGI module, or communication between the CGI module and the synchronization module has an error, the CGI module records and stores a second-type work log to the storage module, where the second-type work log in this embodiment is an error Binlog, and the error Binlog and the whole flow Binlog share the same format with the exception that the error Binlog further includes information that identifies that the uploaded file has failed to be synchronized, and the like.

For an uploaded file whose size is relatively large such as greater than a threshold value, the uploaded file does not need to go through the synchronization module, but the CGI module directly records the error Binlog.

It should be noted that, a whole flow Binlog or an error Binlog is stored for an uploading request.

Step 404. The CGI module of the primary server responds to the uploading request of the client after receiving feedback from of the synchronization module.

It should be noted that, the response of the synchronization module to the CGI module is used to represent whether the synchronization module receives the uploaded file successfully. If the uploaded file is received successfully, the synchronization module sends a success response to the CGI module, and if the uploaded file is not received successfully, the synchronization module sends a failure response to the CGI module. The response of the CGI module to the uploading request of the client is used to represent whether the primary server can process the uploading request successfully, that is, whether the primary server has received and stored the uploaded file successfully. The CGI module responds to the client when receiving the response of the synchronization module.

Step 405. The synchronization module of the primary server further initiates a synchronization request to the CGI module of the standby server, where the synchronization request includes the uploaded file obtained by the synchronization module.

After receiving the synchronization request, the CGI module of the standby server stores the included uploaded file to the storage module (this step is not shown in FIG. 6).

The synchronization module is a multi-threaded and fully asynchronous execution module, and may immediately respond to the CGI module, and asynchronously initiate a synchronization request to the CGI module of the standby server, to rapidly synchronize the uploaded file from the primary server to the standby server. This does not affect a main service process, that is, an uploading process between the primary server and the client. For example, the primary server generates a first thread after confirming that the uploaded file is received successfully, invokes the CGI module, using the first thread, to respond to the uploading request of the client, generates a second thread to invoke the synchronization module, to initiate a synchronization request to the CGI module of the standby server, and executes a subsequent synchronization operation.

Step 406. If the synchronization module fails in initiating the synchronization request to the CGI module of the standby server, the synchronization module may record and store the error Binlog to the storage module.

Figure 7:
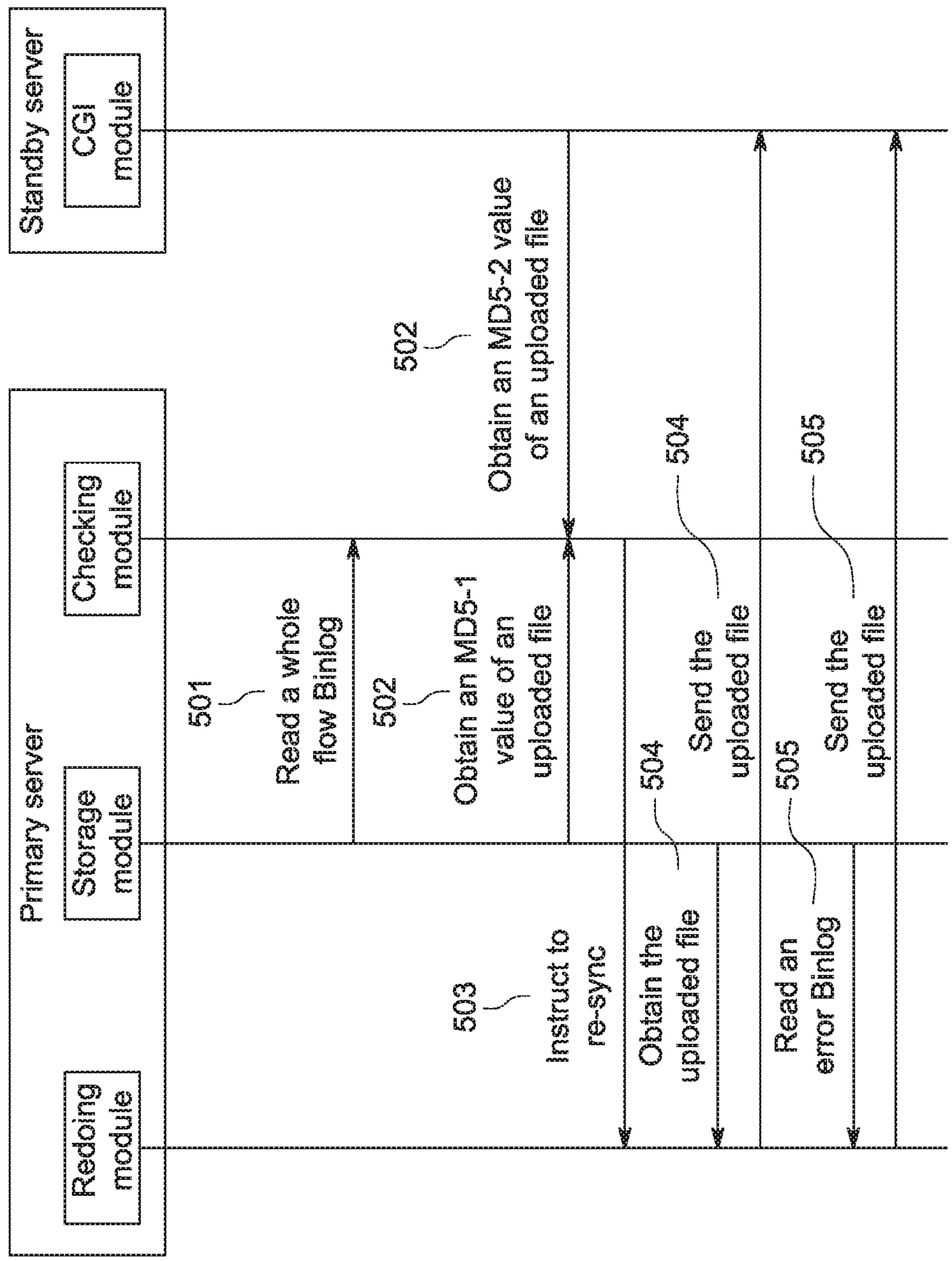
FIG. 7 is a method flowchart of data consistency executed by a primary server according to an embodiment.

In this embodiment, to ensure the consistency of data stored in the primary server and data stored in the standby server, the primary server may perform the following steps. As illustrated in FIG. 7, the steps include:

Step 501. The checking module of the primary server may initiate a checking process regularly, and read, from the storage module, a whole flow Binlog stored in a period of time.

During specific implementation, the checking module may invoke, on the hour, the storage module to process a whole flow Binlog stored four hours ago.

Step 502. The checking module obtains a verification code of an uploaded file stored in the storage module for each piece of the whole flow Binlog, where the verification code of this embodiment is a Message Digest Algorithm 5(MD5)-1 value; and the checking module further requests the CGI module of the standby server to obtain an MD5-2 value of a corresponding uploaded file stored in the storage module of the standby server.

Specifically, the checking module may send a HEAD request to both the CGI module of the primary server and the CGI module of the standby server, to separately obtain the MD5-1 value and the MD5-2 value.

Step 503. If the MD5-1 value is consistent with the MD5-2 value, it indicates that the uploaded file stored in the primary server is consistent with the uploaded file stored in the standby server, and process another whole flow Binlog according to the foregoing step 502; and if the MD5-1 value is inconsistent with the MD5-2 value, the checking module may instruct the redoing module to perform resynchronization.

In another case, the checking module also has some functions of the redoing module, that is, sends the corresponding uploaded file to the CGI module of the standby server when the MD5-1 is inconsistent with the MD5-2 (not shown in FIG. 7).

Step 504. The redoing module sends the corresponding uploaded file stored in the storage module of the primary server to the CGI module of the standby server, and the CGI module of the standby server stores the corresponding uploaded file to the storage module of the standby server (not shown).

Step 505. The redoing module of the primary server continually reads the error Binlog stored in the storage module, and performs a redoing process, that is, sends the uploaded file that is identified in the error Binlog and that has not been synchronized to the CGI module of the standby server. If the redoing module cannot read the error Binlog, the redoing module attempts to read the error Binlog after waiting for 30 seconds (30 s), and performs the redoing process.

If the redoing module fails in performing a redoing process for an error Binlog, the redoing module may perform at most three redoing process attempts for the error Binlog, and if each of the three attempts fails, the redoing module quits sending the uploaded file. Generally, the case in which each of the three attempts fails occurs when the network between the primary server and the standby server is faulty. In this case, another approach may be used, that is, after the network resumes, the checking module of the primary server may read the error Binlog at a specific time, and the checking module sends the corresponding uploaded file to the CGI module of the standby server.

To avoid the impact generated for an uploaded service of the client by the primary server by obtaining a large quantity of verification codes of the uploaded file (that is, the forgoing large quantity of initiated HEAD requests) in a short time, the checking module may uniformly set tasks in one specific hour to be executed in the hour if possible.

In another specific embodiment, for the problem that checking cannot be performed when the primary server is faulty, when processing the uploading request, the CGI module of the primary server may store the uploaded file to another storage server (the storage server is dedicatedly used for storing the uploaded file) deployed outside the primary server, and the whole flow Binlog and the error Binlog are still stored in the storage module of the primary server. The synchronization module of the primary server may back up the whole flow Binlog and the error Binlog stored in the storage module to another deployed log backup machine (see, e.g., FIG. 5). The log backup machine also has a function of initiating a checking process, and may specifically initiate, after each piece of Binlog is backed up, a process for the whole flow Binlog stored one hour before the backup operation. A specific processing method is similar to the processing method for the whole flow Binlog by the checking module of the primary server in the foregoing steps 502 to 504, with the exception that the log backup machine obtains an MD5 value of the uploaded file from another deployed storage server.

Figure 8:
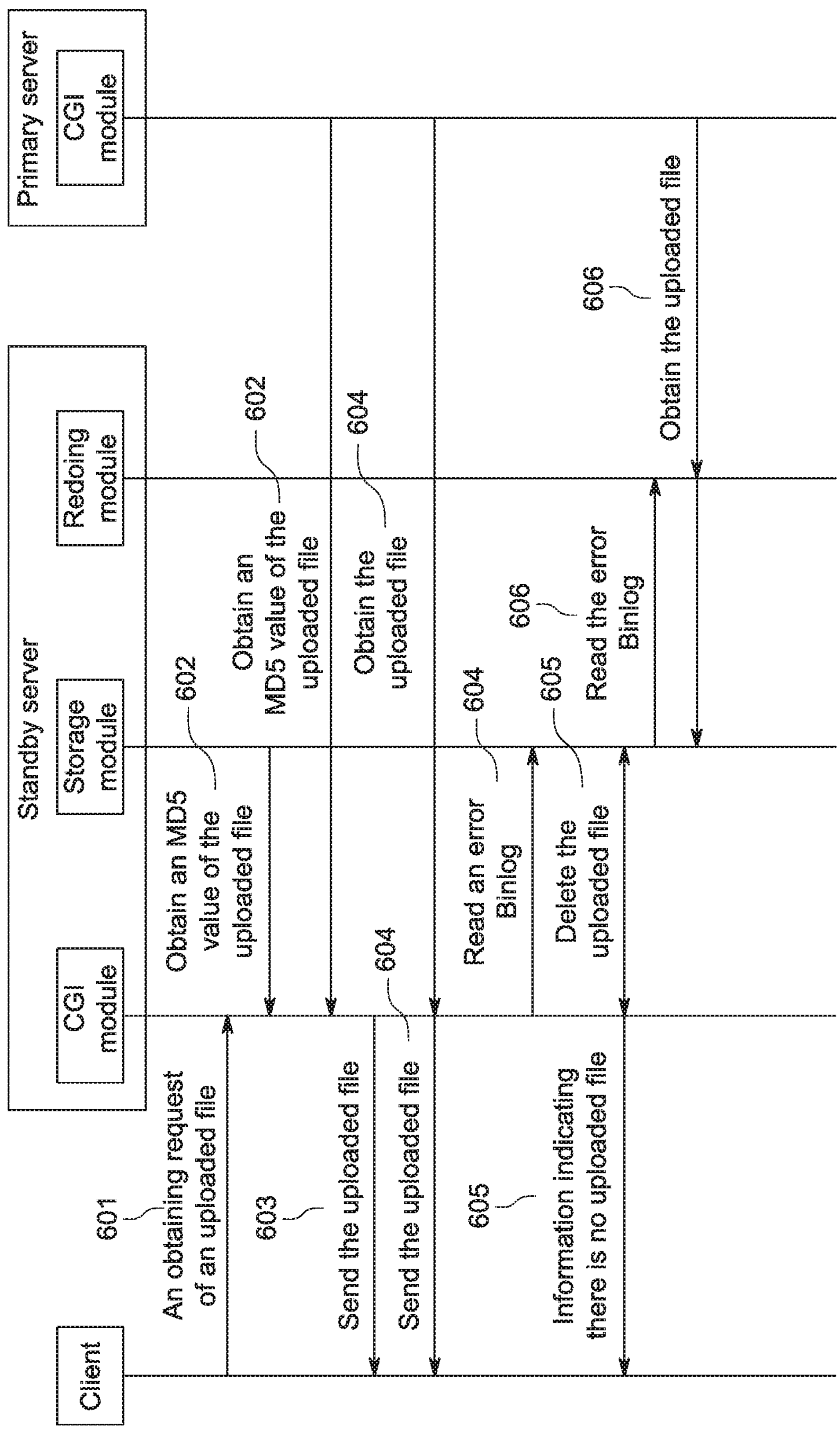
FIG. 8 is a method flowchart of data consistency executed by a standby server according to an embodiment.

In this embodiment, to ensure the consistency of data stored in the primary server and data stored in the standby server, the standby server may perform the following steps. As illustrated in FIG. 8, the steps include:

Step 601. A client sends an obtaining (GET) request of an uploaded file to the CGI module of a standby server, the request including information about the uploaded file.

Step 602. The CGI module of the standby server obtains, according to the obtaining request, an MD5 value of the corresponding uploaded file stored in the storage module, and requests the CGI module of the primary server to obtain the MD5 value of the uploaded file corresponding to the obtaining request.

Specifically, the CGI module of the standby server may obtain, through a backend interface, the MD5 value of the corresponding uploaded file stored in the storage module of the standby server, and send a HEAD request to the CGI module of the primary server. The HEAD request is used for obtaining an MD5 value of a corresponding uploaded file stored in the storage module of the primary server.

Step 603. The CGI module of the standby server compares the obtained two MD5 values, and if the two MD5 values are consistent, returns the corresponding uploaded file stored in the storage module of the standby server to the client.

Step 604. If the two MD5 values are inconsistent, or the locally obtained MD5 value is null and the MD5 value obtained from the CGI module of the primary server is not null, the CGI module of the standby server obtains the corresponding uploaded file from the CGI module of the primary server, and returns the corresponding uploaded file to the client. The CGI module may record the error Binlog corresponding to the uploaded file and store the error Binlog to the storage module.

Step 605. If the locally obtained MD5 value is not null and the MD5 value obtained from the CGI module of the primary server is null, the CGI module of the standby server may directly return to the client information used for indicating there is no uploaded file. The CGI module of the standby server deletes the uploaded file stored in the storage module.

In addition, if the CGI module of the standby server does not locally obtain the MD5 value of the uploaded file successfully, the CGI module may send the uploaded file obtained from the primary server to the client; and if the CGI module of the standby server does not obtain the MD5 value of the uploaded file from the standby server successfully, the CGI module of the standby server may directly send the locally stored uploaded file to the client.

Step 606. The redoing module of the standby server continually reads the error Binlog from the storage module, and performs a redoing process, that is, obtains the uploaded file corresponding to the error Binlog from the CGI module of the primary server and stores the uploaded file into the storage module of the standby server. If the redoing module cannot read the error Binlog, the redoing module attempts to read the error Binlog after waiting for 30 seconds (30 s), and performs the redoing process.

If the redoing module fails in executing a redoing process for an error Binlog, the redoing module may perform at most three redoing process attempts for the error Binlog.

Device Embodiment 1

Figure 9:
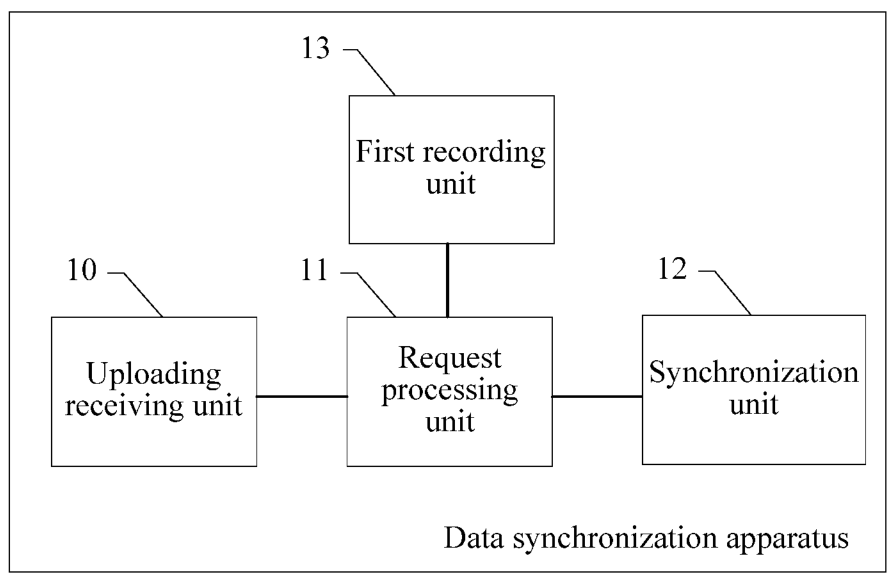
FIG. 9 is a schematic structural diagram of a data synchronization apparatus according to an embodiment.

A data synchronization apparatus such as the foregoing primary server is further provided. As shown in FIG. 9, the apparatus may specifically include the following:

an uploading receiving unit 10, configured to receive an uploading request sent by a client, the uploading request including to-be-uploaded data;

a request processing unit 11, configured to respond to the uploading request of the client after the data is obtained successfully, and store the obtained data;

a synchronization unit 12, configured to initiate a synchronization request of the data to a standby server when the value of the data stored in the request processing unit 11 is not greater than a threshold value, so that the standby server stores the data;

a first recording unit 13, configured to record a second-type work log when the data stored in the request processing unit 11 is greater than the threshold value, the second-type work log including: indication information, used for indicating data that has not been synchronized to the standby server.

It can be seen that, in the data synchronization apparatus of this embodiment, the uploading receiving unit 10 receives an uploading request sent by a client, and immediately responds to the uploading request of the client after the request processing unit 11 processes the uploading request, that is, after data is obtained successfully, and the synchronization unit 12 synchronizes data whose value is not greater than a threshold value to a standby server asynchronously. Because the processing step of the data synchronization apparatus for the uploading request and the synchronization step of the data synchronization apparatus for the data are performed asynchronously, the data synchronization apparatus does not need to respond to the client after both the data synchronization apparatus and the standby server store the data, so that synchronization of the data does not affect a service uploading process. The data synchronization apparatus temporarily does not synchronize data whose value is greater than the threshold value, but only the first recording unit 13 records a second-type work log. The second-type work log includes information that data has failed to be synchronized to the standby server, so that the data synchronization apparatus may subsequently complete synchronization of the data according to the second-type work log, and synchronization of data with larger values can avoid affecting synchronization of other data.

Figure 10:
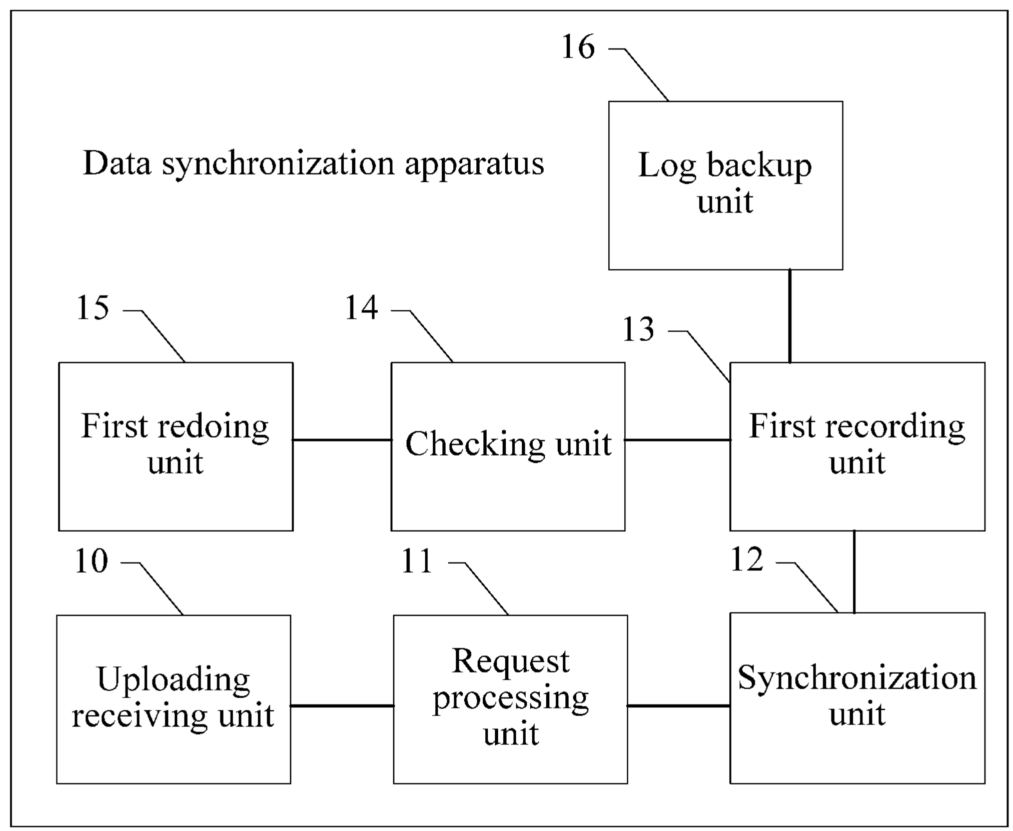
FIG. 10 is a schematic structural diagram of a data synchronization apparatus according to another embodiment.

Referring to FIG. 10, in a specific embodiment, in addition to the structure shown in FIG. 9, the data synchronization apparatus may further include a checking unit 14, a first redoing unit 15, and a log backup unit 16.

The first recording unit 13 in FIG. 10 is further configured to record a first-type work log if the data is synchronized to the standby server successfully, for example, the synchronization unit 12 initiates the synchronization request to the standby server successfully. The first-type work log includes information about the data. The first recording unit 13 is further configured to record a second-type work log if the data has failed to be synchronized to the standby server, for example, the synchronization unit 12 fails in initiating the synchronization request to the standby server. The second-type work log includes information about the data that has failed to be synchronized to the standby server.

The checking unit 14 is configured to initiate a checking process, that is, read multiple pieces of the first-type work log recorded by the first recording unit 13; read the information about the data from the first-type work log for each piece of the first-type work log, and locally obtain first data and a first verification code of the first data according to the information about the data; obtain second data and a second verification code of the second data from the standby server according to the information about the data; and instruct the first redoing unit 15 to send the first data if the first verification code is inconsistent with the second verification code.

The first redoing unit 15 is configured to send the first data to the standby server, so that the standby server replaces the second data with the first data.

The first redoing unit 15 is further configured to continually initiate a redoing process, that is, read the second-type work log recorded in the first recording unit 13; obtain third data that corresponds to the second-type work log and that is stored in the data synchronization apparatus, and send the third data to the standby server, so that the standby server stores the third data.

The log backup unit 16 is configured to send the first-type work log and the second-type work log recorded by the first recording unit 13 to a log backup machine, so that the log backup machine determines, according to the first-type work log, that data stored in the primary server is inconsistent with data stored in the standby server, and sends the inconsistent data stored in the data synchronization apparatus to the standby server for storage; or send, according to the second-type work log, the data that has not been synchronized to the standby server for storage.

Device Embodiment 2

Figure 11:
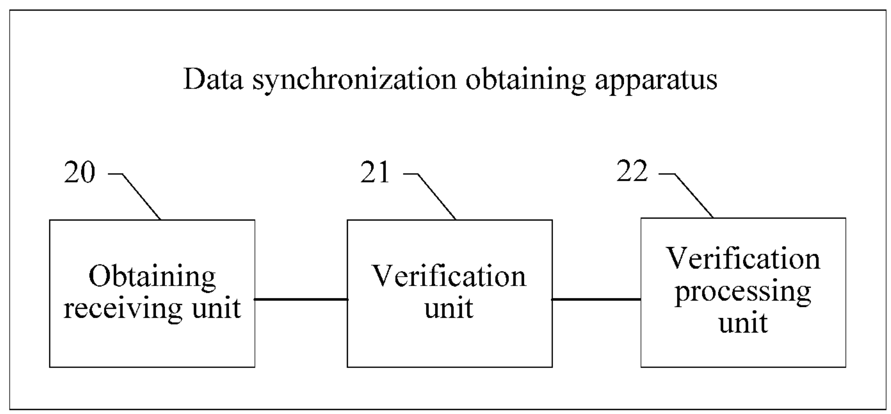
FIG. 11 is a schematic structural diagram of a data synchronization obtaining apparatus according to an embodiment.

A data synchronization obtaining apparatus such as the foregoing standby server is further provided. As shown in FIG. 11, the apparatus may specifically include:

an obtaining receiving unit 20, configured to receive a data obtaining request sent by a client, the data obtaining request including information about to-be-obtained data;

a verification unit 21, configured to obtain a third verification code of locally stored data corresponding to the information about the to-be-obtained data included in the data obtaining request received by the obtaining receiving unit 20, where the locally stored data is stored according to a synchronization request sent by a primary server; obtain a fourth verification code of the data that corresponds to the information about the to-be-obtained data and that is stored in the primary server; and instruct a verification processing unit 22 to respond to the client if the third verification code is inconsistent with the fourth verification code, or the third verification code is null and the fourth verification code is not null; and the verification processing unit 22, configured to obtain the data corresponding to the information about the to-be-obtained data from the primary server, and respond to the data corresponding to the information about the to-be-obtained data to the client.

The verification processing unit 22 is further configured to delete the locally stored data corresponding to the information about the to-be-obtained data if the verification unit 21 determines that the fourth verification code is null and the third verification code is not null, and respond with information that no data is corresponding to the information about the to-be-obtained data to the client.

It can be seen that, in this embodiment, a client may actively obtain synchronized local data from the data synchronization obtaining apparatus of this embodiment, so that the verification unit 21 of the data synchronization obtaining apparatus first verifies whether data stored in a standby server is consistent with data stored in a primary server, and if the data stored in the standby server is inconsistent with the data stored in the primary server, obtain the data from the primary server and return the data to the client. In this way, the data synchronization obtaining apparatus may verify, according to a request of the client, whether the data stored in the data synchronization obtaining apparatus is consistent with the data stored in the primary server, to further ensure, in some manner, the consistency of the data stored in the data synchronization obtaining apparatus and the data stored in the primary server.

Figure 12:
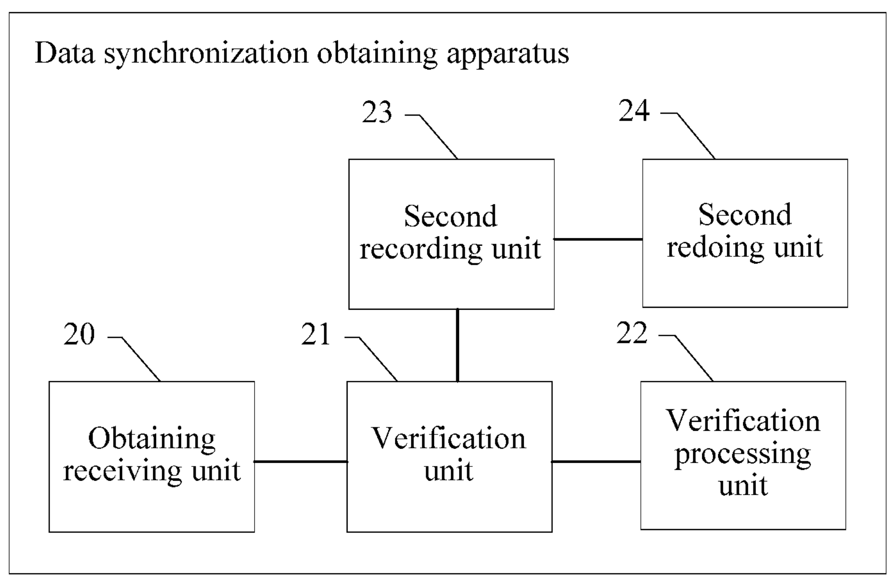
FIG. 12 is a schematic structural diagram of a data synchronization obtaining apparatus according to another embodiment.

Referring to FIG. 12, in a specific embodiment, in addition to the structure shown in FIG. 11, the data synchronization obtaining apparatus may further include a second recording unit 23 and a second redoing unit 24.

The second recording unit 23 is configured to record a second-type work log if the verification unit 21 verifies that the third verification code is inconsistent with the fourth verification code, or the third verification code is null and the fourth verification code is not null, the second-type work log including information that the data corresponding to information about the to-be-obtained data has failed to be synchronized.

The second redoing unit 24 is configured to read the second-type work log recorded by the second recording unit 23, and obtain data corresponding to the second-type work log from the primary server for storage. Therefore, the consistency of the data stored in the data synchronization obtaining apparatus and the data stored in the primary server is ensured.

Device Embodiment 3

Figure 13:
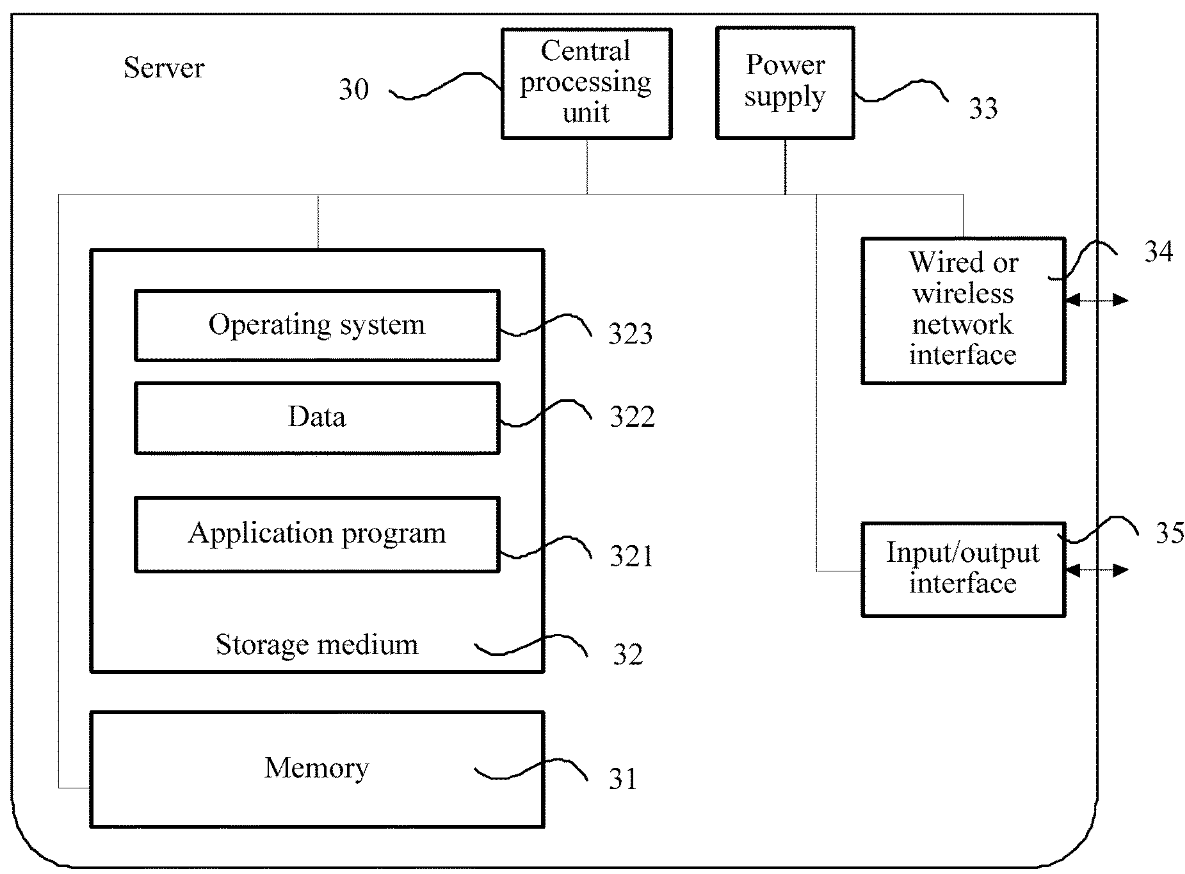
FIG. 13 is a schematic structural diagram of a server according to an embodiment.

A server is further provided, and the schematic structural diagram is shown in FIG. 13. The server greatly differs due to different configurations or performances. The server may include one or more central processing units (CPUs) 30 (for example, one or more processors) and a memory 31, one or more storage media 32 for storing an application program 321 or data 322 (for example, one or more mass storage devices). The memory 31 and the storage medium 32 may be transient or persistent storages. The program stored in the storage medium 32 may include one or more modules (not shown in FIG. 13), and each module may include a series of instructions and operations. Further, the CPU 30 may be configured to communicate with the storage medium 32, and perform, on the data synchronization system, a series of instructions and operations in the storage medium 32.

The server may further include one or more power supplies 33, one or more wired or wireless network interfaces 34, one or more input/output interfaces 35, and/or one or more operating systems 323, for example, Windows Server™, Mac OS X™, Unix™, Linux™, or FreeBSD™.

The steps performed by the primary server or the standby server in the foregoing method embodiments may be based on the structure of the server shown in FIG. 13. For example, the memory 31 or the storage medium 32 may store machine readable code, and the CPU 30 may execute the machine readable code to perform the methods shown in FIG. 2, FIG. 3, FIG. 4, and FIG. 6 to FIG. 8 and execute the operations of the apparatuses shown in FIG. 9 to FIG. 12.

The embodiments further provide a data synchronization system, including a primary server and a standby server. The structure of the primary server may be the data synchronization apparatus according to the foregoing Device Embodiment 1, or the structure of the server according to the foregoing Device Embodiment 3. The standby server is configured to receive a synchronization request for the data, and store the data.

Further, the structure of the standby server may be the data synchronization obtaining apparatus according to the foregoing Device Embodiment 2, or the structure of the server according to the foregoing Device Embodiment 3. Details are not provided herein again.

The embodiments of this application provide a non-volatile storage medium, configured to store machine readable instructions, and perform the foregoing methods when the machine readable instructions are executed.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

A data synchronization method and system, a synchronization obtaining method, and a related apparatus according to embodiments are described in detail above. The embodiments of the present disclosure are described herein through specific examples. The description about the embodiments is merely provided for ease of understanding of the method and core ideas of the present disclosure. Meanwhile, persons of ordinary skill in the art can make variations to the embodiments of the present disclosure according to the ideas of the present disclosure. Therefore, the content of the specification should not be construed as a limit to the present disclosure.

What is claimed is:

1. A method comprising:

receiving, by at least one processor, an uploading request from a client, the uploading request comprising data to be uploaded;

responding, by the at least one processor, to the uploading request after the data is obtained successfully from the client;

locally storing the obtained data;

when the size of the data is less than a threshold value, initiating a synchronization request to a standby server for requesting the standby server to store the data;

when the size of the data is greater than or equal to the threshold value, not initiating the synchronization request, and generating and locally storing a work log comprising indication information for indicating data that has not been synchronized to the standby server, reading the indication information from the work log;

locally reading the data that has not been synchronized to the standby server according to the indication information, and sending the data that has not been synchronized to the standby server to be stored, and generating and storing another work log comprising information about the obtained data, in response to the obtained data being synchronized successfully to the standby server, wherein the responding to the uploading request and the sending the data that has not been synchronized to the standby server occur asynchronously, and wherein the method further comprises:

reading multiple pieces of the another work log;

reading the information about the obtained data from the another work log for each piece of the another work log, and locally obtaining first data and a first verification code of the first data according to the information about the obtained data;

obtaining second data and a second verification code of the second data from the standby server according to the information about the obtained data; and in response to the first verification code being inconsistent with the second verification code, sending the first data to the standby server to replace the second data with the first data to synchronize the obtained data.

2. The method according to claim 1, wherein the method further comprises:

generating and locally storing the work log in response to the synchronization request being initiated but the data has failed to be synchronized successfully to the standby server.

3. The method according to claim 1, wherein the method further comprises:

sending the another work log and the work log to a log backup device, wherein, in response to determining, according to the another work log, that data stored in the primary server is inconsistent with data stored in the standby server, the log backup device sends the inconsistent data that is locally stored to the standby server for storage; or sends, according to the work log, the data that has not been synchronized to the standby server for storage.

4. An apparatus comprising:

at least one memory configured to store computer program code; and at least one processor configured to access the at least one memory and operate according to the computer program code, the computer program code including:

receiving code configured to cause the at least one processor to receive, by at least one processor, an uploading request from a client, the uploading request comprising data to be uploaded;

responding code configured to cause the at least one processor to respond, by the at least one processor, to the uploading request after the data is obtained successfully from the client;

storing code configured to cause the at least one processor to locally store the obtained data;

initiating code configured to cause the at least one processor to, when the size of the data is less than a threshold value, initiate a synchronization request to a standby server for requesting the standby server to store the data;

first generating code configured to cause the at least one processor to, when the size of the data is greater than or equal to the threshold value, not initiate the synchronization request, and generate and store a work log comprising indication information for indicating data that has not been synchronized to the standby server;

reading code configured to cause the at least one processor to read the indication information from the work log;

sending code configured to cause the at least one processor to locally read the data that has not been synchronized to the standby server according to the indication information, and send the data that has not been synchronized to the standby server to be stored; and first work log generating code configured to cause the at least one processor to generate and store another work log comprising information about the obtained data, in response to the obtained data being synchronized successfully to the standby server, wherein the responding to the uploading request and the sending the data that has not been synchronized to the standby server occur asynchronously, and wherein the computer program code further comprises:

first reading code configured to cause the at least one processor to read multiple pieces of the another work log;

second reading code configured to cause the at least one processor to read the information about the obtained data from the another work log for each piece of the another work log, and locally obtain first data and a first verification code of the first data according to the information about the obtained data;

verification code configured to cause the at least one processor to obtain second data and a second verification code of the second data from the standby server according to the information about the obtained data; and sending code configured to cause the at least one processor to, in response to the first verification code being inconsistent with the second verification code, send the first data to the standby server to replace the second data with the first data to synchronize the obtained data.

5. The apparatus according to claim 4, wherein the computer program code further comprises:

second generating code configured to cause the at least one processor to generate and locally store the work log in response to the synchronization request being initiated but the data has failed to be synchronized successfully to the standby server.

6. The apparatus according to claim 4, wherein the method further comprises:

sending code configured to cause the at least one processor to send the another work log and the work log to a log backup device, wherein, in response to determining, according to the another work log, that data stored in the primary server is inconsistent with data stored in the standby server, the log backup device sends the inconsistent data that is locally stored to the standby server for storage; or sends, according to the work log, the data that has not been synchronized to the standby server for storage.

7. A non-transitory computer readable medium storing computer program code which, when executed by at least one processor, performs the following operations:

receiving, by at least one processor, an uploading request from a client, the uploading request comprising data to be uploaded;

responding, by the at least one processor, to the uploading request after the data is obtained successfully from the client;

locally storing the obtained data;

when the size of the data is less than a threshold value, initiating a synchronization request to a standby server for requesting the standby server to store the data;

when the size of the data is greater than or equal to the threshold value, not initiating the synchronization request, and generating and storing a work log comprising indication information for indicating data that has not been synchronized to the standby server;

reading the indication information from the work log;

locally reading the data that has not been synchronized to the standby server according to the indication information, and sending the data that has not been synchronized to the standby server to be stored; and generating and storing another work log comprising information about the obtained data, in response to the obtained data being synchronized successfully to the standby server, wherein the responding to the uploading request and the sending the data that has not been synchronized to the standby server occur asynchronously, and wherein the at least one processor further performs:

reading multiple pieces of the another work log;

reading the information about the obtained data from the another work log for each piece of the another work log, and locally obtaining first data and a first verification code of the first data according to the information about the obtained data;

obtaining second data and a second verification code of the second data from the standby server according to the information about the obtained data; and in response to the first verification code being inconsistent with the second verification code, sending the first data to the standby server to replace the second data with the first data to synchronize the obtained data.

8. The non-transitory computer readable medium according to claim 7, wherein the at least one processor further performs:

generating and locally storing the work log in response to the synchronization request being initiated but the data has failed to be synchronized successfully to the standby server.

9. The non-transitory computer readable medium according to claim 7, wherein the at least one processor further performs:

sending the another work log and the work log to a log backup device, wherein, in response to determining, according to the another work log, that data stored in the primary server is inconsistent with data stored in the standby server, the log backup device sends the inconsistent data that is locally stored to the standby server for storage; or sends, according to the work log, the data that has not been synchronized to the standby server for storage.

* * * * *